No. 681,214. Patented Aug. 27, 1901.
C. GLOVER.
PEDAL.
(Application filed Aug. 16, 1899.)
(No Model.)
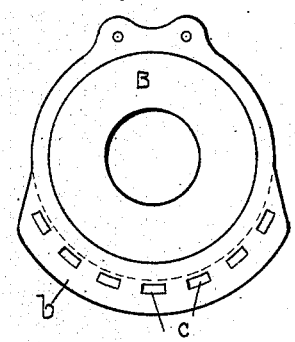
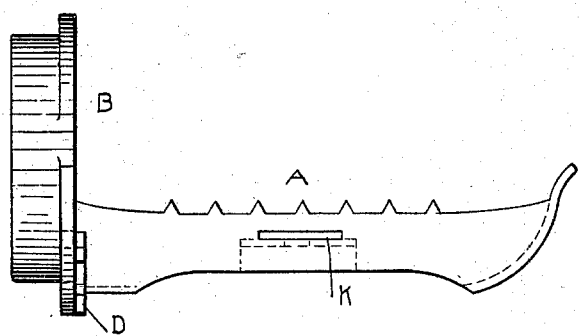
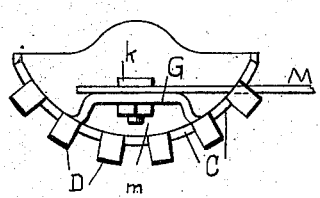
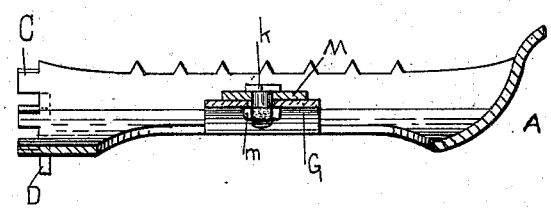
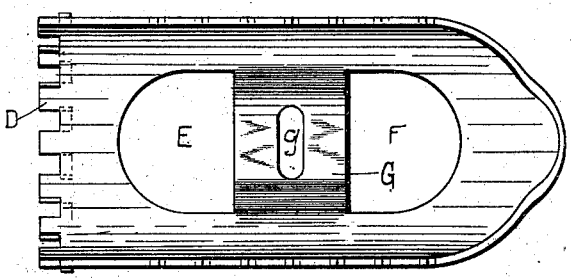
Witnesses:
A. N. Upson.
Jenny L. Haugh
Inventor.
Charles Glover.
BY N. B. Stait.
ATTORNEY.

UNITED STATES PATENT OFFICE.

CHARLES GLOVER, OF NEW BRITAIN, CONNECTICUT.

PEDAL.

SPECIFICATION forming part of Letters Patent No. 681,214, dated August 27, 1901.

Application filed August 16, 1899. Serial No. 727,463. (No model.)

*To all whom it may concern:*

Be it known that I, CHARLES GLOVER, a citizen of the United States, and a resident of New Britain, county of Hartford, State of Connecticut, have invented certain new and useful Improvements in Pedals, of which the following is a full, clear, and exact description, by which any one skilled in the art can make and use the same.

My invention relates to the general class of velocipede-pedals, and has for its object to produce a simple and strong method of attaching the tread of a pedal to the supporting member and also to so shape the tread as to form a support for an adjustable toe-clip. The means by which these objects are accomplished are described in the annexed specification and shown in the drawings, in which—

Figure 1 is a side view of the pedal. Fig. 2 is a sectional view of the tread separate from the supporting member. Fig. 3 is a top view of the same. Fig. 4 is an end view of the same. Fig. 5 is a front view of the supporting member.

Referring to the drawings, A denotes the tread of a pedal, B a support to which the tread may be attached, and $b$ a flange which extends part way around its periphery, having in it the holes $c$. At the inner end of the tread are formed several projections, some of which are straight, as C, and are adapted to enter the holes $c$, formed in the flange on the supporting member, the others, D, being bent downwardly at substantially a right angle. When the parts are to be assembled, the straight projections C are inserted in the holes $c$ until the downturned projections D bear against the flange, the projections C being then riveted down or fastened to hold the parts together. The downturned projections D, forming braces to support the tread, are absolutely necessary in order that it be strong enough to withstand the severe strains to which pedals are subjected. Heretofore in order to get sufficient strength it has been necessary to make parts extremely heavy, and by my device an extremely light pedal is obtained which is sufficiently strong to withstand any ordinary pressure.

The tread of this pedal is preferably made from sheet metal and is cut away at E in order to decrease its weight, leaving the bridge G, which I utilize as a support for the adjustable toe-clip. The part G is bent upwardly, as shown in Fig. 3, and is slotted, as at $g$, a slot K being formed through the side plate of the tread, its lower edge being approximately in line with the upper surface of the bridge G. The end of a toe-clip M is inserted through the slot K and rests on the bridge G, being held in position by any well-known means, as by the bolt $k$, passing through the end of the toe-clip and through the slot $g$ and engaging the nut $m$. By an arrangement of this kind all toe-clips can be made of one size and adjusted to suit the requirements of any rider by moving it backward or forward in the slot $g$.

I claim as my invention—

1. In a pedal whose tread is supported wholly at one end, means for attaching the tread to the supporting member, comprising a plurality of projections, some of which act as rivets, the others being bent to approximately a right angle and acting as braces.

2. In a pedal, a tread, a supporting member therefor, means for attaching the tread thereto comprising a series of projections integral with the tread and entering and secured in openings in the supporting member, and means for bracing said tread comprising a second series of projections also integral with the tread but having lines of separation therefrom, said series bearing against the supporting member below the first series of projections.

3. In a pedal in combination, a supporting member having a flange part way around its periphery and holes formed at regular intervals through the flange, a tread, a series of projections integral with the inner end thereof entering the holes in the flange and fastened thereto, and a second series of projections formed integrally on the tread and having lines of separation therefrom, said second series acting as braces for the tread.

4. In a tread for pedals, a supporting-strip formed integrally therewith extending between the side plates, a slot through one of the side plates in line with the supporting-strip and in the plane of the top thereof, and a slot through the supporting-strip, substantially as described.

5. In a pedal, a tread of curved cross-section formed from sheet metal, and having a supporting-strip offset above the bottom of the tread and arranged crosswise thereof, and slotted to permit of adjustably securing the toe-clip thereto.

6. In a pedal in combination, a supporting member, and a tread having two or more series of projections at its inner end and integral therewith, one series forming the connecting means between the tread and the supporting member and the other series acting directly as braces.

7. In a pedal, a supporting member having a series of transverse openings, combined with a sheet-metal tread having a series of projections within the plane of its body secured in said openings, and a second series of projections respectively interposed between the projections of the first series and standing out of the plane of said body so as to act as braces to maintain the relative position of the two members.

8. In a pedal, a supporting member having a series of transverse openings, combined with a transversely-curved sheet-metal tread having a series of projections within the plane of its body secured in said openings, and a second series of projections standing out of the plane of said body and in contact with only the outer face of the supporting member so as to act as braces to maintain the relative position of the two members.

Signed in the presence of two witnesses this 4th day of August, A. D. 1899.

CHAS. GLOVER.

Witnesses:
 A. H. GAMERDINGER,
 H. HERBERT WETHERILL.